United States Patent
Brown et al.

(10) Patent No.: US 8,606,767 B2
(45) Date of Patent: Dec. 10, 2013

(54) EFFICIENT METADATA INVALIDATION FOR TARGET CKD VOLUMES

(75) Inventors: Theresa Mary Brown, Tucson, AZ (US); Nedlaya Yazzie Francisco, Tucson, AZ (US); Beth Ann Peterson, Tucson, AZ (US); Suguang Li, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 13/369,222

(22) Filed: Feb. 8, 2012

(65) Prior Publication Data

US 2013/0204854 A1   Aug. 8, 2013

(51) Int. Cl.
*G06F 17/30* (2006.01)

(52) U.S. Cl.
USPC .............................. 707/700; 714/42; 707/697

(58) Field of Classification Search
USPC .............. 707/697, 699, 700; 714/42; 711/114
See application file for complete search history.

(56) References Cited

U.S. PATENT DOCUMENTS

| | | | |
|---|---|---|---|
| 6,112,277 A * | 8/2000 | Bui et al. ....................... | 711/114 |
| 6,470,421 B1 * | 10/2002 | Bui et al. ....................... | 711/114 |
| 7,340,652 B2 | 3/2008 | Jarvis et al. | |
| 7,647,463 B2 * | 1/2010 | Jarvis et al. ................... | 711/162 |
| 7,945,758 B1 * | 5/2011 | Michael et al. ............... | 711/173 |
| 7,970,992 B1 * | 6/2011 | Michael et al. ............... | 711/114 |
| 8,156,380 B2 * | 4/2012 | Kalos et al. ..................... | 714/42 |
| 8,190,832 B2 * | 5/2012 | Dickey et al. ................. | 711/156 |
| 2005/0257097 A1 * | 11/2005 | Jarvis et al. ..................... | 714/42 |
| 2007/0294589 A1 * | 12/2007 | Jarvis et al. ..................... | 714/42 |
| 2008/0306991 A1 * | 12/2008 | Kalos et al. ................... | 707/102 |
| 2010/0191925 A1 | 7/2010 | Blount et al. | |

* cited by examiner

*Primary Examiner* — Cam-Linh Nguyen

(74) *Attorney, Agent, or Firm* — Nelson and Nelson; Daniel P. Nelson; Alexis V. Nelson

(57) ABSTRACT

A method for invalidating metadata associated with a target count-key-data (CKD) volume is disclosed. The method initially receives a command for a target CKD volume. The command is either an "establish" command for establishing a point-in-time copy relationship, or a "withdraw" command for withdrawing a point-in-time copy relationship. The method determines a track range, spanning a number of data tracks in the CKD volume, associated with the command. Each data track in the track range is associated with a metadata track. For each metadata track whose associated data tracks are fully contained in the track range, the method performs a first procedure. For each metadata track whose associated data tracks are not fully contained in the track range, the method performs a second procedure different from the first procedure. A corresponding apparatus and computer program product are also disclosed.

20 Claims, 8 Drawing Sheets

EFFICIENT METADATA INVALIDATION FOR TARGET CKD VOLUMES

BACKGROUND

1. Field of the Invention

This invention relates to apparatus and methods for efficiently invalidating metadata for target count-key-data (CKD) volumes.

2. Background of the Invention

When establishing and withdrawing CKD FlashCopy® relationships, the data tracks of the target CKD volume must have their metadata invalidated. This is because the customer data on the target CKD volume is no longer valid or is unknown. The invalidation must occur before the data tracks on the CKD volume are accessed.

When establishing a FlashCopy® relationship, the metadata may be replicated from the source CKD volume to the target CKD volume. However, this is typically not performed due to the time constraints of copying the metadata. Instead, the target metadata is invalidated and rebuilt at the time a data track is copied from the source volume to the target volume. That is, when a data track is copied from the source volume to the target volume, the metadata for the data track is rebuilt on the target side.

Currently, a FlashCopy® target bitmap is used to determine which data tracks need to have their metadata invalidated. If a data track has not yet been copied to a target volume, during track access a FlashCopy® intercept code will indicate that the metadata must be invalidated for this track. Although this optimization maintains the space efficiency for the target volume, it is insufficient for FlashCopy® relationships between extent-space-efficient (ESE) volumes since the target bitmap may not be set for all data tracks in the target volume.

When processing a FlashCopy® withdraw command, the metadata for the target volume must also be invalidated. Since the FlashCopy® relationship will be removed by the withdraw command, the processing cannot be performed asynchronously as occurs with a FlashCopy® establish command. The processing can be slow and can cause command timeouts when the target volume is very large.

In view of the foregoing, what are needed are apparatus and methods to more efficiently invalidate metadata associated with CKD target volumes when point-in-time-copy relationships, such as FlashCopy® relationships, are established or withdrawn. Ideally, such apparatus and methods will more efficiently invalidate metadata associated with target extent-space-efficient (ESE) volumes.

SUMMARY

The invention has been developed in response to the present state of the art and, in particular, in response to the problems and needs in the art that have not yet been fully solved by currently available apparatus and methods. Accordingly, the invention has been developed to provide apparatus and methods to efficiently invalidate metadata associated with CKD target volumes when point-in-time-copy relationships, such as FlashCopy® relationships, are established or withdrawn. The features and advantages of the invention will become more fully apparent from the following description and appended claims, or may be learned by practice of the invention as set forth hereinafter.

Consistent with the foregoing, a method for invalidating metadata associated with a target count-key-data (CKD) volume is disclosed. The method initially receives a command for a target CKD volume. The command is either an "establish" command for establishing a point-in-time copy relationship, or a "withdraw" command for withdrawing a point-in-time copy relationship. The method determines a track range, spanning a number of data tracks in the CKD volume, associated with the command. Each data track in the track range is associated with a metadata track. For each metadata track whose associated data tracks are fully contained in the track range, the method performs a first procedure. For each metadata track whose associated data tracks are not fully contained in the track range, the method performs a second procedure different from the first procedure.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
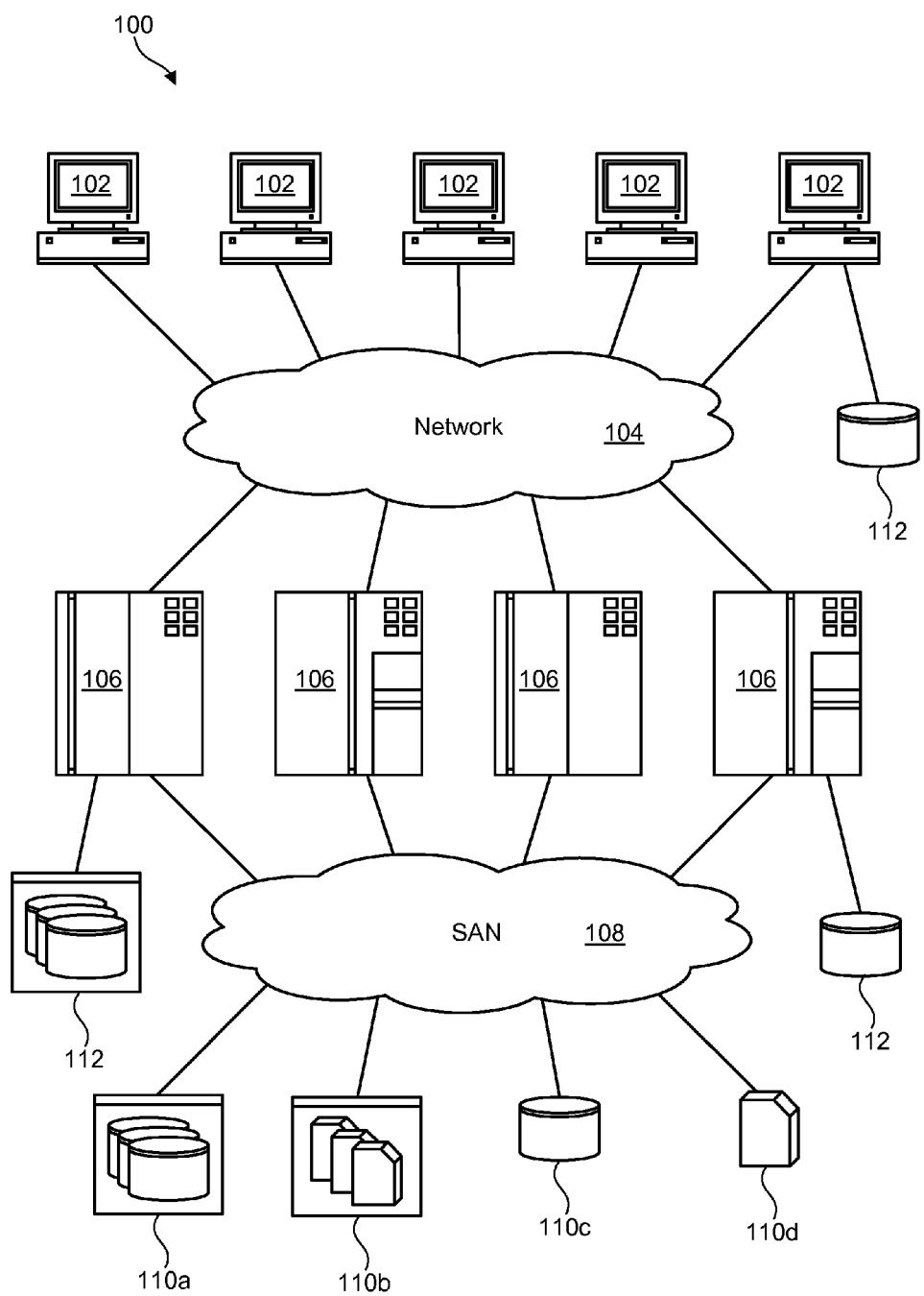
FIG. 1 is a high-level block diagram showing one example of a network architecture in which an apparatus and method in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where an apparatus and method in accordance with the invention may be implemented. The network architecture 100 is presented only by way of example and not limitation. Indeed, the apparatus and methods disclosed herein may be applicable to a wide variety of network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the apparatus and methods disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the apparatus and methods disclosed herein.

Figure 2:
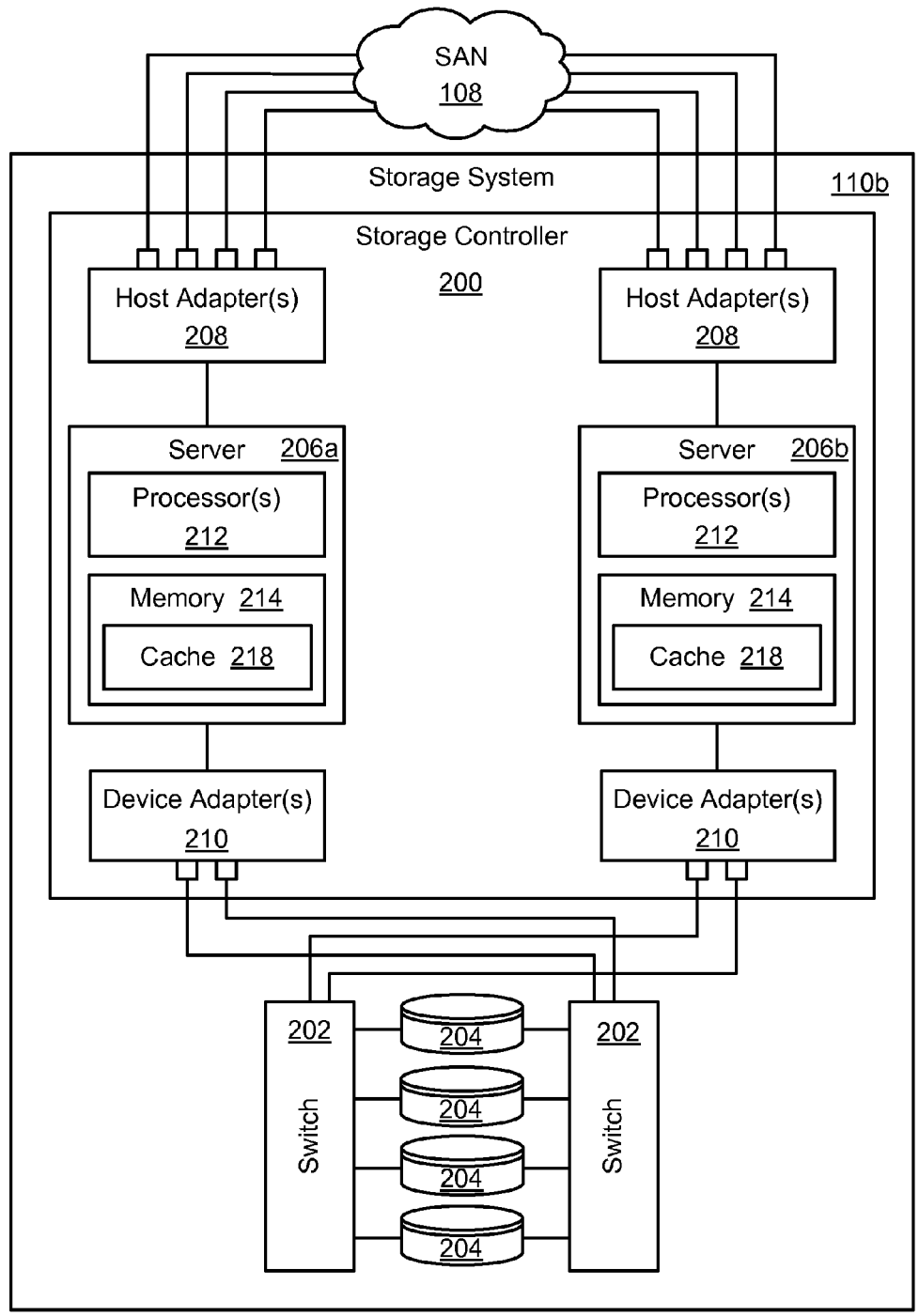
FIG. 2 is a high-level block diagram showing one example of a storage system in which an apparatus and method in accordance with the invention may operate.

Referring to FIG. 2, one embodiment of a storage system 110b containing an array of hard-disk drives 204 and/or solid-state drives 204 is illustrated. The internal components of the storage system 110b are shown since the apparatus and methods disclosed herein may, in certain embodiments, be implemented within such a storage system 110b, although the apparatus and methods may also be applicable to other storage systems 110. As shown, the storage system 110b includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

One example of a storage system 110b having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to the IBM DS8000™ enterprise storage system 110b, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

In selected embodiments, the memory 214 includes a cache 218. Whenever a host 106 (e.g., an open system or mainframe server 106) performs a read operation, the server 206 that performs the read may fetch data from the storages devices 204 and save it in its cache 218 in the event it is needed again. If the data is requested again by a host 106, the server 206 may fetch the data from the cache 218 instead of fetching it from the storage devices 204, saving both time and resources. Similarly, when a host 106 performs a write, the server 106 that receives the write request may store the write in its cache 218. The server 106 may then destage the write to the storage devices 204 as time and resources allow.

Figure 3:
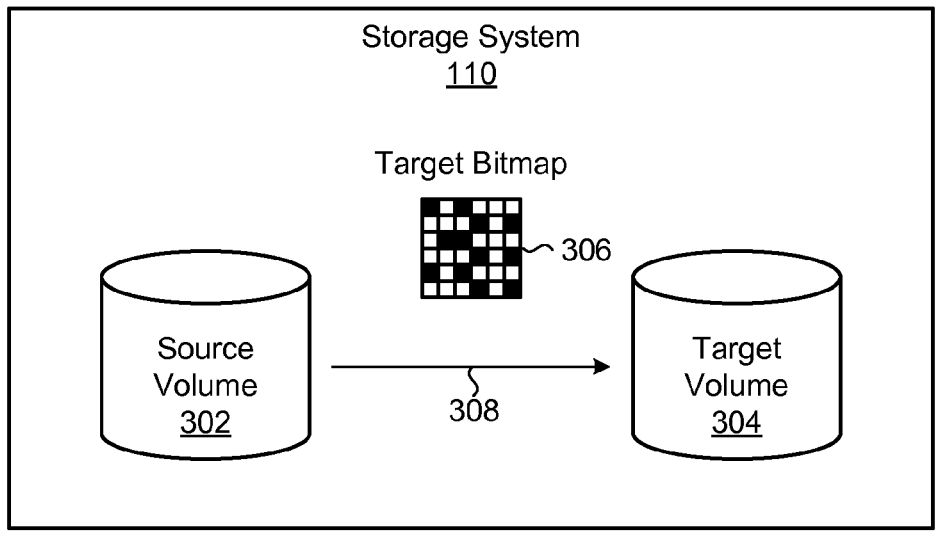
FIG. 3 is a high-level block diagram showing a point-in-time-copy relationship between a source volume and a target volume, wherein a target bitmap is used to determine which data tracks have been copied from the source volume to the target volume.

Referring to FIG. 3, a high-level block diagram showing a point-in-time-copy relationship (e.g., a FlashCopy relationship) between a source volume 302 and a target volume 304 is illustrated. Such a relationship may be implemented within a storage system 110, such as the storage system 110b illustrated in FIG. 2. Once such a relationship is established, data may be read from either the source volume 302 or the target volume 304 even though data may still not be copied from the source volume 302 to the target volume 304. A target bitmap 306 associated with a target volume 304 may be used to keep track of which data tracks have actually been copied from the source volume 302 to the target volume 304. For example, a "0" in the target bitmap 306 may indicate that a data track has been copied (i.e., the target volume 304 has its own data), whereas a "1" may indicate that a data track has not yet been copied. In cases where the target bitmap 306 contains a "1," a read to a track on the target volume 306 may be directed to the corresponding track on the source volume 302. For the purposes of this disclosure, a bit in a target bitmap 304 is said to be "set" if it contains a "1" and "reset" if it contains a "0," although this could be reversed in other embodiments. Although the source 302 and targets 304 are labeled as "volumes" in the illustrated embodiment, it should be recognized that the source 302 and targets 304 could also be datasets or other ranges of data tracks.

Figure 4:
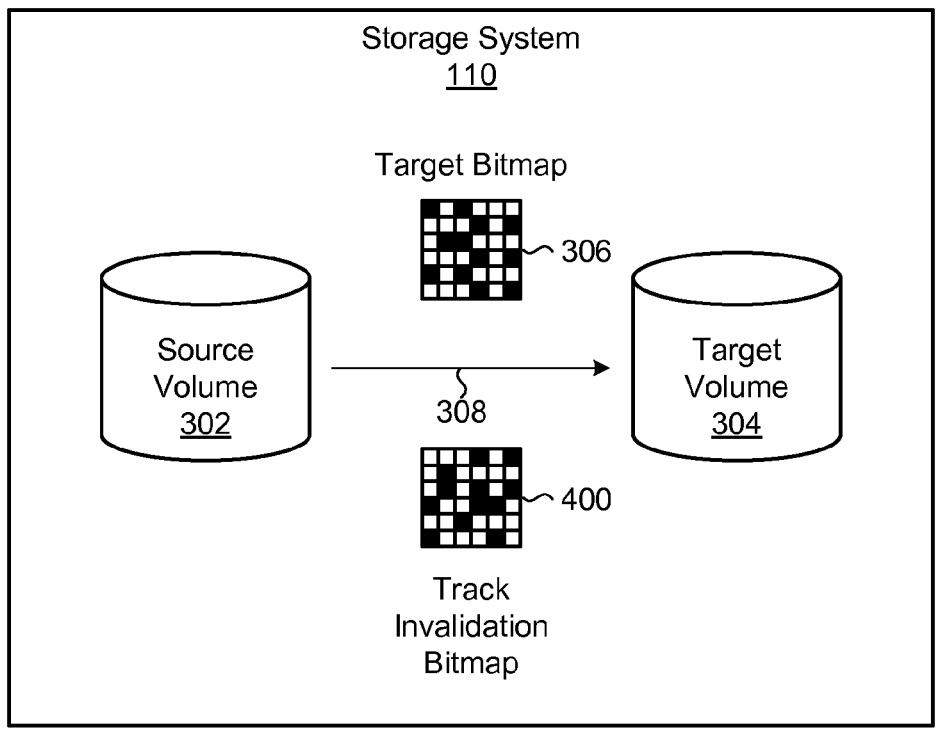
FIG. 4 is a high-level block diagram showing a point-in-time-copy relationship between a source volume and a target volume, wherein a target bitmap is used to determine which data tracks have been copied from the source volume to the target volume, and a track invalidation bitmap is used to determine which data tracks in the target volume need to have their metadata invalidated.

Referring to FIG. 4, in order to keep track of which target data tracks need to have their metadata invalidated when a relationship 308 is established or withdrawn, a track invalidation bitmap 400 may be established. In certain embodiments, the track invalidation bitmap 400 is structurally identical to the target bitmap 306, although this may not be necessary in all cases. The track invalidation bitmap 400 may include a bit for each data track in the target volume 304. A "1" in the track invalidation bitmap 400 may indicate that the corresponding data track needs to have its metadata invalidated, whereas a "0" in the track invalidation bitmap 400 may indicate that a data track does not need to have its metadata invalidated or has already had its metadata invalidated. For the purposes of this disclosure, a bit in the track invalidation bitmap 400 is said to be "set" if it contains a "1" and "reset" if it contains a "0," although this could be reversed in other embodiments.

Figure 5:
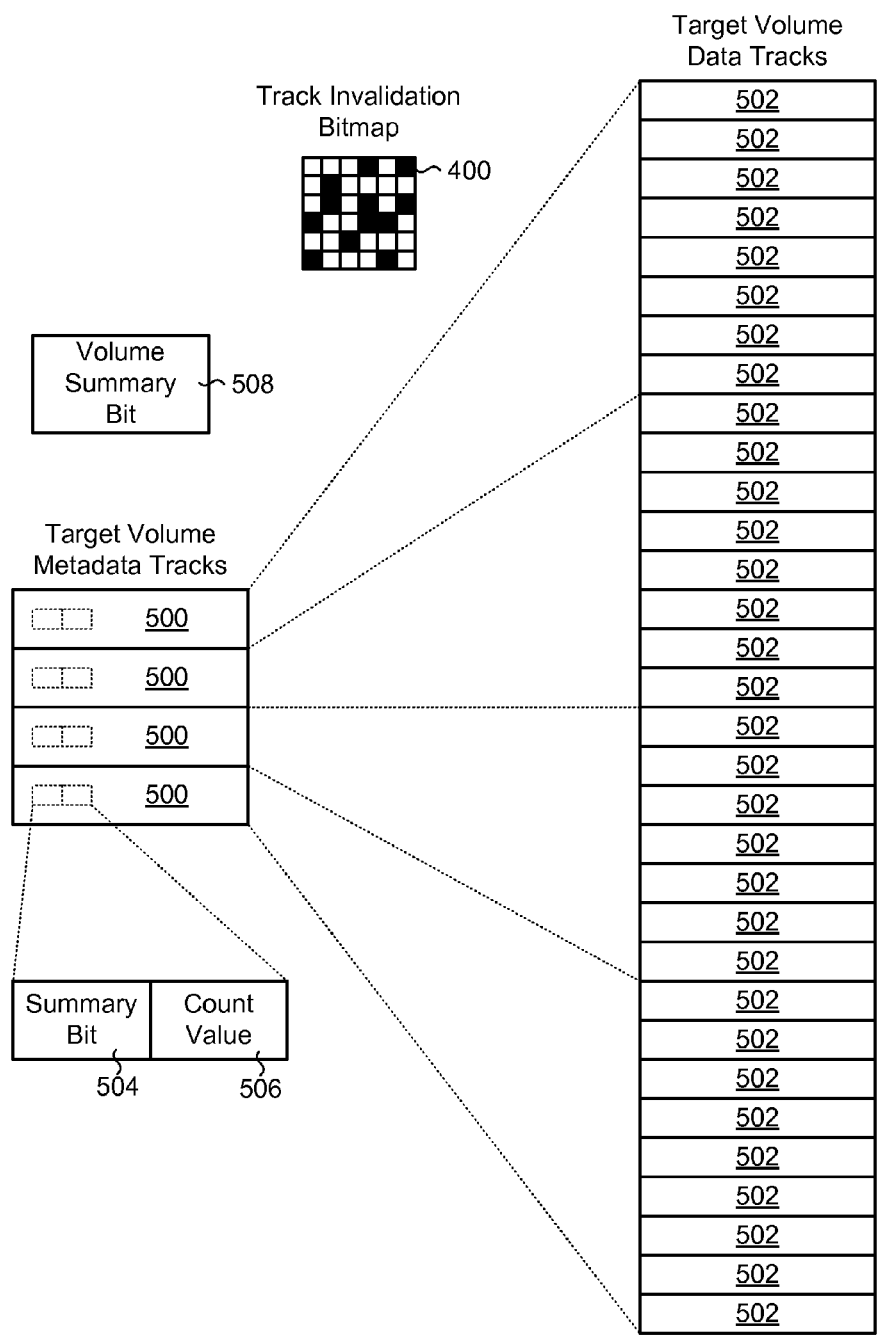
FIG. 5 is a high-level block diagram showing the correlation between data tracks and metadata tracks, as well as various indicators that may be used to determine which data tracks need to have their metadata invalidated.

Referring to FIG. 5, in addition to the track invalidation bitmap 400, several new indicators 504, 506, 508 may be provided to aid in efficiently invalidating metadata. As shown, each target data track 502 may have a target metadata track 500 associated therewith. A metadata track 500 may contain metadata for multiple data tracks 502. A target volume 304 may have multiple metadata tracks 500 associated therewith, each of which may represent multiple data tracks 502.

In order to more efficiently invalidate metadata for a target volume 304, a summary bit 504 and a count value 506 may be provided for each metadata track 500. When the summary bit 504 of a metadata track 500 is set, this may indicate that all data tracks 502 associated with the metadata track 500 need to have their metadata invalidated, and thus all corresponding bits in the track invalidation bitmap 400 need to be set. When the summary bit 504 of a metadata track 500 is not set, this may indicate that at least one data track 502 associated with the metadata track 500 does not need to have its metadata invalidated or has already had its metadata invalidated, and thus at least one corresponding bit in the track invalidation bitmap 400 is not set.

The count value 506 of a metadata track 500 may indicate how many data tracks 502 associated with the metadata track 500 need to have their metadata invalidated. Stated otherwise, the count value 506 may indicate how many bits (each representing a data track 502) associated with the metadata track 500 are set in the track invalidation bitmap 400. If the metadata associated with a data track 502 is invalidated and the corresponding bit in the track invalidation bitmap 400 is reset, the count value 506 is decremented to reflect the current number of data tracks 502 associated with the metadata track 500 that still need to have their metadata invalidated.

A volume summary bit 508 may be provided for the entire target volume 304. When set, the volume summary bit 508 may indicate that there is at least one data track 502 in the target volume 304 that needs to have its metadata invalidated.

In certain embodiments, the volume summary bit 508 is stored and maintained in processor memory for quick access.

Figure 6:
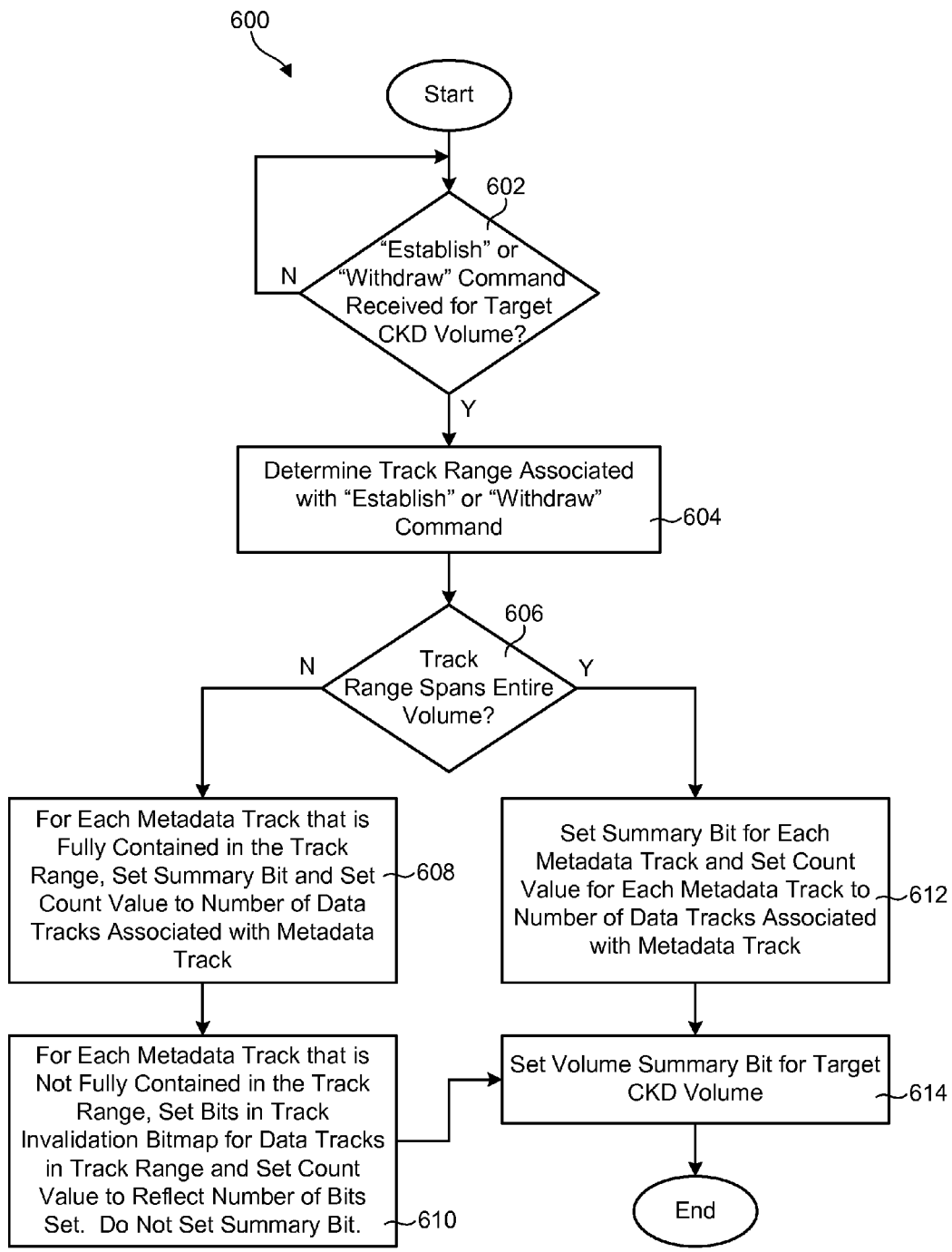
FIG. 6 is a flow diagram showing one embodiment of a method for indicating, using the indicators described in FIG. 5, which data tracks need to have their metadata invalidated in response to an establish or withdraw command.

FIG. 6 shows one embodiment of a method 600 for indicating, using the indicators 400, 504, 506, 508 described in FIG. 5, which data tracks 502 need to have their metadata invalidated. As shown in FIG. 6, the method 600 initially determines 602 whether an "establish" or "withdraw" command (either establishing or withdrawing a point-in-time-copy relationship) has been received for a target volume 304. If an "establish" or "withdraw" command has been received, the method 600 determines 604 a track range associated with the "establish" or "withdraw" command.

If the method 600 determines 606 that the track range spans the entire target volume 304, then the method 600 sets 612 the summary bit 504 for each metadata track 500 associated with the target volume 304 and sets 612 the count value 506 of each metadata track 500 to the full number of data tracks 502 associated with the metadata track 500. Setting the summary bit 504 for a metadata track 500 may initiate an asynchronous background process that sets all bits in the track invalidation bitmap 400 for the metadata track 500 as time and resources allow. One example of such an asynchronous background process will be described in association with FIG. 7.

If, on the other hand, the method 600 determines 606 that the track range does not span the entire target volume 304, then the method 600 may perform two different procedures 608, 610. More specifically, for each metadata track 500 whose data tracks 502 are fully contained in the track range, the method 600 sets 608 the summary bit 504 and sets 608 the count value 506 to the full number of data tracks 502 associated with the metadata track 500. As mentioned above, setting the summary bit 504 for a metadata track 500 may initiate an asynchronous background process that sets all bits in the track invalidation bitmap 400 for the metadata track 500.

On the other hand, for each metadata track 500 whose data tracks 502 are not fully contained in the track range (which may include the metadata tracks 500 at the beginning and/or end of the track range), the method 600 sets 610 the bits in the track invalidation bitmap 400 for those data tracks 502 that are in the track range and sets 610 the count value 506 to reflect the number of bits that have been set in the track invalidation bitmap 400 for the metadata track 500. This procedure 610 does not set the summary bit 504.

Once either step 612 or steps 608, 610 have been performed, the method 600 sets 614 the volume summary bit 508 for the target volume 304 and the method 600 ends. As mentioned above, the volume summary bit 508 indicates that there is at least one data track 502 in the target volume 304 that needs to have its metadata invalidated.

Figure 7:
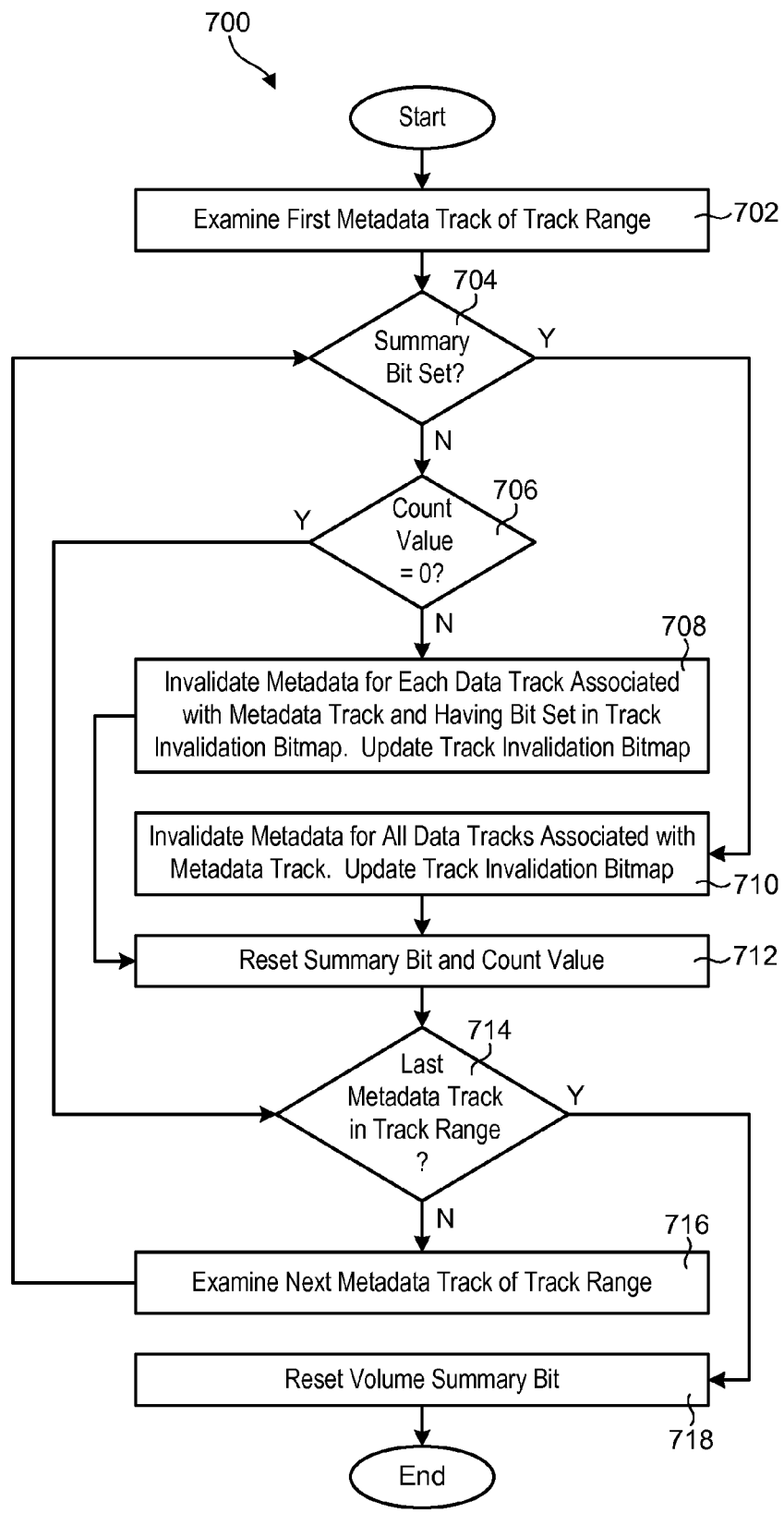
FIG. 7 is a flow diagram showing one embodiment of a method for invalidating metadata using a background invalidation process.
Figure 8:
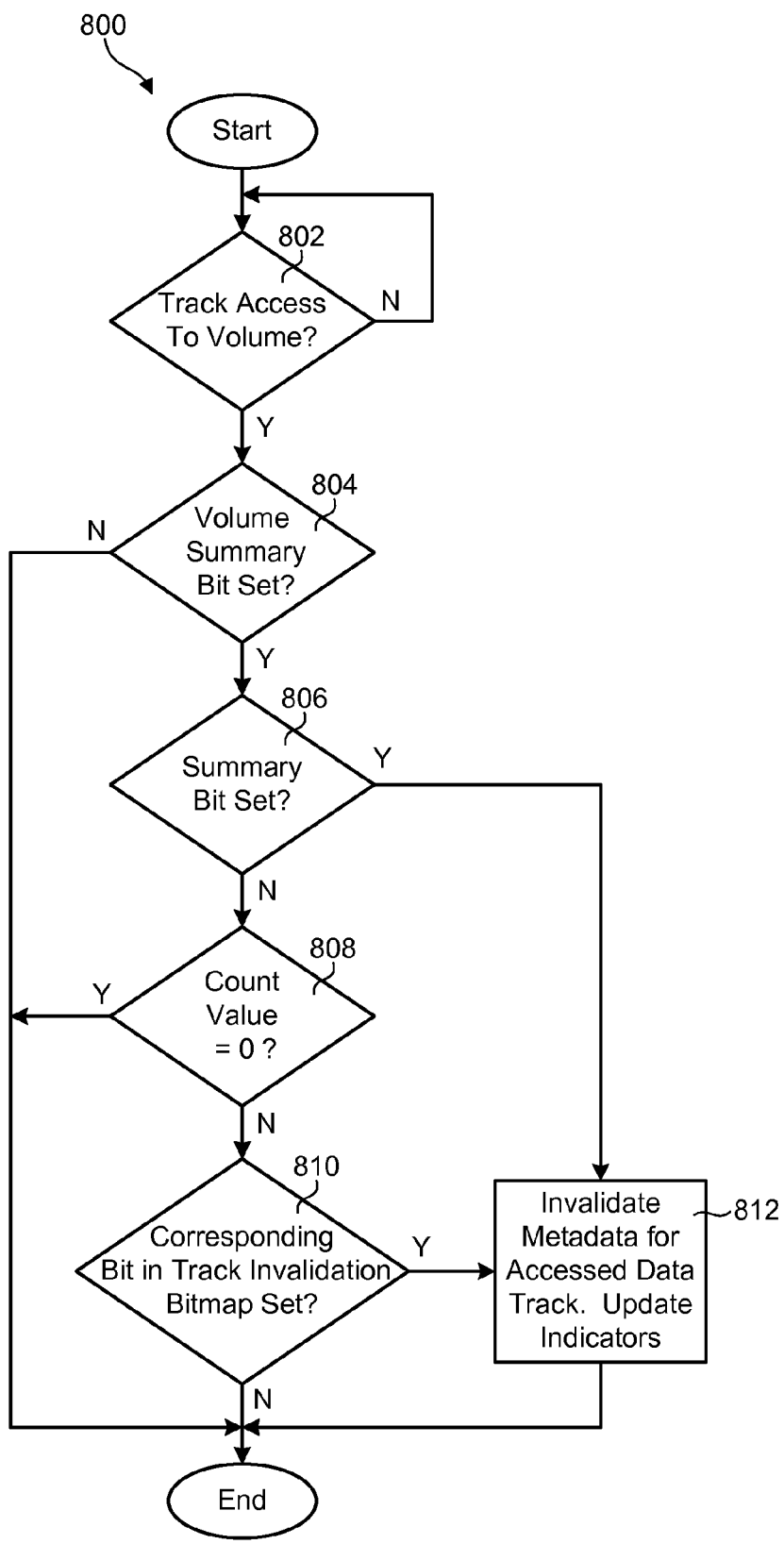
FIG. 8 is a flow diagram showing one embodiment of a method for invalidating metadata at the time a data track is accessed.

Once the indicators 400, 504, 506, 508 have been set for a target volume 304, the metadata may then be invalidated by various processes. More specifically, the metadata of each data track 502 may be invalidated by either an asynchronous background process, as discussed above, or at track access time if the asynchronous background process has not yet been able to invalidate the metadata. FIG. 7 describes one embodiment of a method to perform an asynchronous background process. FIG. 8 describes one embodiment of a method for invalidating a data track's metadata at the time the data track is accessed.

Referring to FIG. 7, one embodiment of a method 700 for invalidating metadata using an asynchronous background invalidation process is illustrated. As shown, the method 700 initially examines 702 the first metadata track 500 of the track range identified 604 in the method 600 of FIG. 6. The method 700 then determines 704 whether the summary bit 504 of the first metadata track 500 is set. If the summary bit 504 is set, this indicates that all data tracks 502 associated with the metadata track 500 need to have their metadata invalidated. In such a case, the method 700 invalidates 710 the metadata for all data tracks 502 associated with the metadata track 500 and updates 710 the track invalidation bitmap 400 by resetting all bits associated with the metadata track 500. The method 700 then resets 712 the summary bit 504 and count value 506 of the metadata track 500.

If, at step 704, the summary bit 504 is not set, the method 700 determines 706 whether the count value 506 is equal to zero. If the count value 506 is not equal to zero, this indicates that there is at least one data track 502 associated with the metadata track 500 that needs to have its metadata invalidated. In such a case, the method 700 checks the track invalidation bitmap 400 and invalidates 708 the metadata for each data track 502 that is associated with the metadata track 500 and that has its corresponding bit set in the track invalidation bitmap 400. The method 700 then updates 710 the track invalidation bitmap 400 by resetting the bits for data tracks 502 that have had their metadata invalidated. The method 700 then resets 712 the summary bit 504 (which is already reset in this case) and resets 712 the count value 506 of the metadata track 500.

The method 700 then determines 714 if the metadata track 500 that was just processed is the last metadata track 500 in the track range. If not, the method 700 examines 716 the next metadata track 500 in the track range and repeats the steps 704, 706, 708, 710, 712 as previously described. The method 700 continues this process for all metadata tracks 500 in the track range. Once the method 700 has processed the last metadata track 500 in the track range, the method 700 resets 718 the volume summary bit 508 of the target volume 304 and the method 700 ends.

Referring to FIG. 8, one embodiment of a method 800 for invalidating metadata at data track access time is illustrated. As mentioned above, in certain cases, an attempt to access a data track 502 of a target volume 304 may occur before the asynchronous background invalidation process has had a chance to invalidate the metadata associated with the accessed data track 502. In such a case, the method 800 illustrated in FIG. 8 may be used to invalidate the metadata for the data track 502 at track access time.

As shown, the method 800 initially determines 802 whether a request to access a data track 502 in the target volume 304 has been received. If so, the method 800 checks 804 whether the volume summary bit 508 associated with the target volume 304 is set. If the volume summary bit 508 is not set, this indicates that all metadata for the target volume 304 has already been invalidated and the method 800 ends.

If the volume summary bit 508 is set, this indicates that there is at least one data track 502 in the target volume 304 that needs to have its metadata invalidated. In such a case, the method 800 determines 806 whether the summary bit 504 of the metadata track 500 associated with the accessed data track 502 is set. If the summary bit 504 is set, this indicates that all data tracks 502 associated with the metadata track 500 need to have their metadata invalidated. In such a case, the method 800 invalidates 812 the metadata associated with the accessed data track 502 and updates the indicators 400, 504, 506, 508 (i.e., the track invalidation bitmap 400, summary bit 504, count value 506, and/or volume summary bit 508) accordingly. A method for updating 812 the indicators 400, 504, 506, 508 is described in FIG. 9.

If, at step 806, the summary bit 504 is not set, the method 800 determines 808 whether the count value 506 is equal to zero. If the count value 506 is equal to zero, this indicates that there are no data tracks 502 associated with the metadata track 500 that need to have their metadata invalidated. In such a case, the method 800 ends since the accessed data track 502 has already had its metadata invalidated. If the count value 506 is not zero, the method 800 determines 810 whether the bit in the track invalidation bitmap 400 that is associated with the accessed data track 502 is set. If the bit is set, then the metadata associated with the accessed data track 502 needs to be invalidated. In such a case, the method 800 invalidates 812 the metadata associated with the accessed data track 502 and updates 812 the indicators 400, 504, 506, 508 accordingly. If the corresponding bit in the track invalidation bitmap 400 is not set, then the metadata for the accessed data track 502 has already been invalidated and the method 800 ends.

Figure 9:
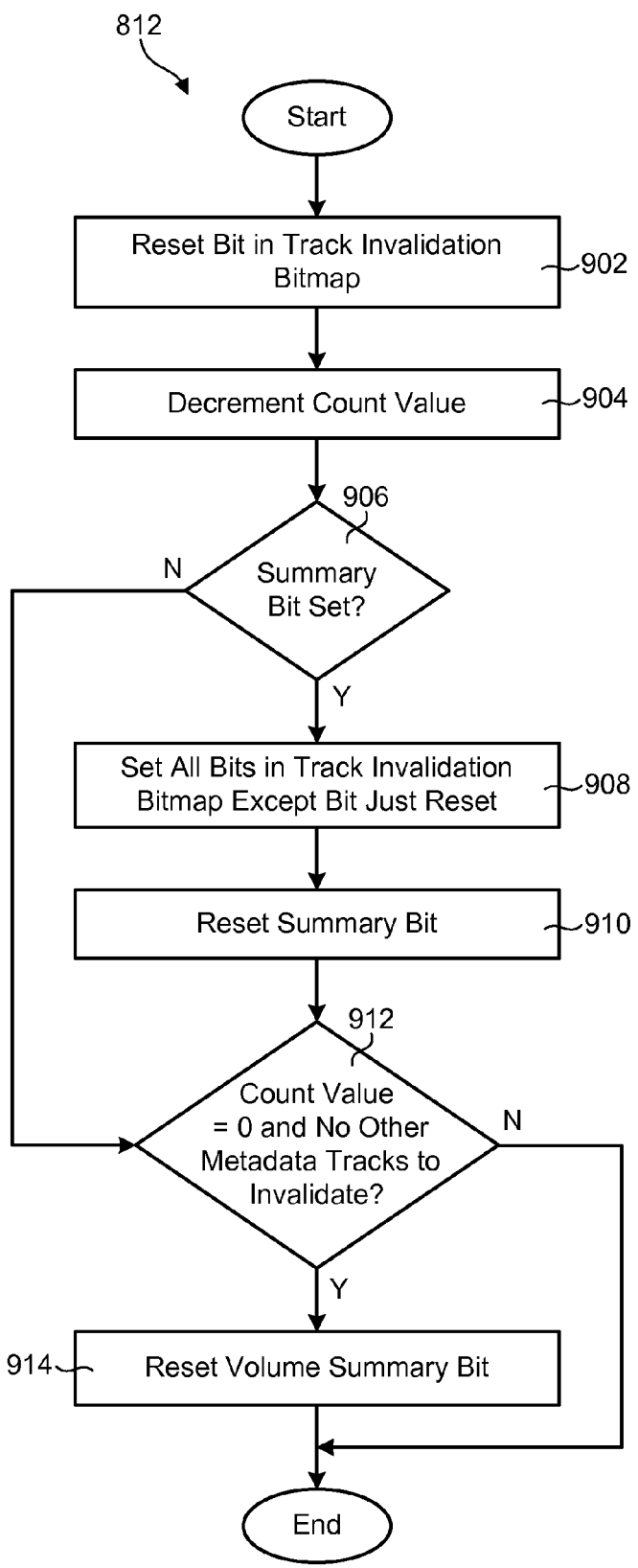
FIG. 9 is a flow diagram showing one embodiment of a method for updating the indicators described in FIG. 5 when metadata has been invalidated by the method of FIG. 8.

Referring to FIG. 9, one embodiment of a method 812 for updating 812 the indicators 400, 504, 506, 508 in response to invalidating metadata for a data track 502 is illustrated. This method 812 may be used in conjunction with the method 800 of FIG. 8 (i.e., performed at step 812 in FIG. 8). As shown, when the metadata for a data track 502 has been invalidated, the method 812 resets 902 the corresponding bit in the track invalidation bitmap 400. The method 812 then decrements 904 the count value 506 in the corresponding metadata track 500 to indicate that one less data track 502 needs to have its metadata invalidated.

The method 812 then determines 906 whether the summary bit 504 of the corresponding metadata track 500 is set. If the summary bit 504 is set, the method 812 sets 908 all bits in the track invalidation bitmap 400 that are associated with the metadata track 500 except the bit that was just reset at step 902. The method 812 then resets the summary bit 504 of the metadata track 500.

If, at step 906, the method 812 determines 906 that the summary bit 504 is not set, the method 812 determines 912 whether the count value 506 of the metadata track 500 is zero and whether there are other metadata tracks 500 that contain data tracks 502 that still need to have their metadata invalidated. If the count value 506 is zero and there are no other metadata tracks 500 that have data tracks 502 that need to have their metadata invalidated, the method 812 resets 914 the volume summary bit 508 of the target volume 304, thereby indicating that all metadata has been invalidated for the target volume 304. If the count value 506 is not zero or there are other metadata tracks 500 that have data tracks 502 that need to have their metadata invalidated, the method 812 leaves the volume summary bit 508 set to indicate that there are still data tracks 502 in the target volume 304 that need to have their metadata invalidated. The method 812 then ends.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for invalidating metadata associated with a target count-key-data (CKD) volume, the method comprising:
   receiving a command for a target CKD volume, wherein the command is one of an "establish" command for establishing a point-in-time copy relationship, and a "withdraw" command for withdrawing a point-in-time copy relationship;
   determining a track range associated with the command, the track range spanning a number of data tracks in the CKD volume, wherein each data track is associated with a metadata track;
   for each metadata track whose associated data tracks are fully contained in the track range, performing a first procedure; and
   for each metadata track whose associated data tracks are not fully contained in the track range, performing a second procedure different from the first procedure.

2. The method of claim 1, wherein performing the first procedure comprises setting a summary bit of the metadata track and setting a count value of the metadata track to the total number of data tracks associated with the metadata track.

3. The method of claim 2, wherein performing the second procedure comprises setting, in a track invalidation bitmap, a bit for each data track in the track range that is associated with the metadata track, and setting a count value of the metadata track to the number of data tracks in the track range.

4. The method of claim 3, further comprising setting a volume summary bit for the target CKD volume.

5. The method of claim 4, further comprising, for each metadata track having its summary bit set, invalidating the metadata for all data tracks associated with the metadata track.

6. The method of claim 5, further comprising, for each metadata track not having its summary bit set and having a nonzero count value, invalidating the metadata for each data track associated with the metadata track and having its bit set in the track invalidation bitmap.

7. The method of claim 6, further comprising resetting the volume summary bit once the metadata for all necessary data tracks in the target CKD volume have been invalidated.

8. The method of claim 4, further comprising, upon receiving a request to access a specific data track in the target CKD volume, checking the volume summary bit.

9. The method of claim 8, further comprising, if the volume summary bit and summary bit associated with the specific data track are set, invalidating the metadata associated with the specific data track.

10. The method of claim 8, further comprising, if the volume summary bit and the bit in the track invalidation bitmap associated with the specific data track are set, invalidating the metadata associated with the specific data track.

11. An apparatus for invalidating metadata associated with a target count-key-data (CKD) volume, the apparatus comprising:
   at least one processor;
   at least one memory device coupled to the at least one processor and storing instructions for execution on the at least one processor, the instructions causing the at least one processor to:
      receive a command for a target CKD volume, wherein the command is one of an "establish" command for establishing a point-in-time copy relationship, and a "withdraw" command for withdrawing a point-in-time copy relationship;

determine a track range associated with the command, the track range spanning a number of data tracks in the CKD volume, wherein each data track is associated with a metadata track;

for each metadata track whose associated data tracks are fully contained in the track range, perform a first procedure; and for each metadata track whose associated data tracks are not fully contained in the track range, perform a second procedure different from the first procedure.

12. The apparatus of claim 11, wherein the first procedure sets a summary bit of the metadata track and sets a count value of the metadata track to the total number of data tracks associated with the metadata track.

13. The apparatus of claim 12, wherein the second procedure sets, in a track invalidation bitmap, a bit for each data track in the track range, and sets a count value of the metadata track to the number of data tracks in the track range.

14. The apparatus of claim 13, wherein the instructions further cause the at least one processor to, for each metadata track having its summary bit set, invalidate the metadata for all data tracks associated with the metadata track.

15. The apparatus of claim 14, wherein the instructions further cause the at least one processor to, for each metadata track not having its summary bit set and having a nonzero count value, invalidate the metadata for each data track associated with the metadata track and having its bit set in the track invalidation bitmap.

16. A computer program product for invalidating metadata associated with a target count-key-data (CKD) volume, the computer program product comprising a computer-readable storage medium having computer-usable program code embodied therein, the computer-usable program code comprising:

computer-usable program code to receive a command for a target CKD volume, wherein the command is one of an "establish" command for establishing a point-in-time copy relationship, and a "withdraw" command for withdrawing a point-in-time copy relationship;

computer-usable program code to determine a track range associated with the command, the track range spanning a number of data tracks in the CKD volume, wherein each data track is associated with a metadata track;

computer-usable program code to, for each metadata track whose associated data tracks are fully contained in the track range, perform a first procedure; and computer-usable program code to, for each metadata track whose associated data tracks are not fully contained in the track range, perform a second procedure different from the first procedure.

17. The computer program product of claim 16, wherein performing the first procedure comprises setting a summary bit of the metadata track and setting a count value of the metadata track to the total number of data tracks associated with the metadata track.

18. The computer program product of claim 17, wherein performing the second procedure comprises setting, in a track invalidation bitmap, a bit for each data track in the track range, and setting a count value of the metadata track to the number of data tracks in the track range.

19. The computer program product of claim 18, further comprising computer-usable program code to, for each metadata track having its summary bit set, invalidate the metadata for all data tracks associated with the metadata track.

20. The computer program product of claim 19, further comprising computer-usable program code to, for each metadata track not having its summary bit set and having a nonzero count value, invalidate the metadata for each data track associated with the metadata track and having its bit set in the track invalidation bitmap.

* * * * *